3,467,654
PROCESS FOR THE RECOVERY AND PURIFICATION OF CEPHALOSPORIN C
Mack H. McCormick, West Lafayette, Ind., assignor to Eli Lilly and Company, Indianapolis, Ind., a corporation of Indiana
No Drawing. Filed Aug. 19, 1966, Ser. No. 573,489
Int. Cl. C07d 99/24
U.S. Cl. 260—243      3 Claims

ABSTRACT OF THE DISCLOSURE

An improvement in a process for the recovery and purification of cephalosporin C from crude fermention medium is disclosed.

---

This invention relates to the production of cephalosporin C by fermentation means, and is particularly concerned with improvements in the recovery and purification of the antibiotic from the crude fermentation medium.

It is known that when a nutrient medium is fermented with certain molds of the genus Cephalosporium (e.g., the strain deposited with the American Type Culture Collection under accession No. ATCC 14553), the medium acquires antibiotic activity. Such fermentations are described in British patent specification 810,196, published Mar. 11, 1959, U.S. Patent 3,184,454, issued May 18, 1965, and French Patent 1,353,113, granted Jan. 13, 1964.

The above patent specifications also describe certain processes for the recovery and purification of cephalosporin C from the crude fermentation liquor. Among the disclosed processes are the following: (1) decolorization by passing the filtered fermentation mixture first through a column containing charcoal, then through a column containing alumina; (2) acidification of the decolorized filtrate with an acidic buffer solution, e.g., pyridine and sulfuric acid, or with an ion-exchange resin in acid form; (3) removal of inorganic anions by passage through a column containing Amberlite IRA-400 (OH$^-$ form) or similar type resin; (4) adsorption of the active cephalosporin on a column containing Amberlite IR-4B (H$^+$ form) or similar type resin; (5) elution with an aqueous buffer, as for example ammonium acetate or the like; and (6) recovery of the cephalosporin C from the eluate.

It is an object of this invention to provide a superior method for the recovery and purification of cephalosporin C.

It is a further object of this invention to provide, in fewer steps and in higher over-all yield, an improved process for the recovery and purification of cephalosporin C from fermentation liquors comprised thereof.

It has been found that these objects can be fulfilled by certain improvements in the prior-art recovery methods for cephalosporin C.

In one aspect, the invention involves a modification of the prior-art method for sephalosporin C recovery whereby from 1 to 4 volumes of acetone are added to the initial broth filtrate, with the unexpected result that many of the unwanted impurities are precipitated from the broth while the cephalosporin C remains in solution.

Another modification of the prior-art method is to immediately pass the acetone-treated broth over an intermediate-strength ion-exchange resin, whereby the cephalosporin C is adsorbed and the depleted solution may then be processed for recovery of the acetone.

To further elucidate these modifications upon the prior-art method of recovery and purification of cephalosporin C, the following general comments and descriptions are pertinent.

Upon adding the desired amount of acetone, ideally about 2 to 3 volumes per volume of the filtered liquor, a suspension, then flocculation, then agglomeration of undesired by-products is obtained. The aqueous medium can then be removed, as for example, by decantation, centrifugation, or filtration. The resulting clarified liquor can be carried to the adsorption step utilizing IR-68, as described hereafter, or alternatively can be contacted with an ion-exchange material composed of a strong resin in H$^+$ form (Dowex 50) in a manner similar to that described in the prior-art for adjustment of pH. The filtrate, whether or not it has been treated with Dowex 50, is then ready for adsorption of the active antibiotic by another ion-exchange resin. It has been found that use of an intermediate-strength anion-exchange resin in the acetate or formate form (conveniently one sold under the designation IR-68 by the Rohm & Haas Corporation) gives a more selective separation of the cephalosporin C antibiotic. This resin is an intermediate-strength anion-exchange resin, as opposed to the strong anion-exchange resin, IRA-400, or the weak resin, IR-4B, employed in the prior art.

The adsorbed antibiotic is conveniently eluted from the resin with a dilute formate or acetate buffer of about pH 2.5 to 5. The buffer solution can be prepared by methods well known in the art, as for example by adjusting a 0.3 M formic acid solution to the desired pH with 0.3 M sodium hydroxide or ammonium hydroxide solution. The eluate can be evaporated in vacuo to yield the purified antibiotic. The temperature of the solution during evaporation should be at or below ambient room temperature, not above about 30° C. The purified cephalosporin C separates in finely divided crystalline form from the syrupy concentrate. The density and viscosity of the slurry are as to make filtration difficult. It has also been found that the addition of 1 to 5 volumes of methanol to the slurry will improve its filterability. This volume of methanol is completely miscible with the liquid phase, does not precipitate the inorganic salts, and does not dissolve the crystallized cephalosporin C. Alternatively, a solution containing approximately equal volumes of ethanol and water and one containing approximately equal volumes of isopropanol and water can accomplish the equivalent function of permitting more rapid filterability of the resulting crystallized cephalosporin C.

Ideally the process of this invention is carried out in the following manner.

The crude cephalosporin C fermentation broth is filtered to remove the mycelia and other insolubles, and the filtrate is stirred while being diluted with about 2 to 3 volumes of acetone. The mixture is allowed to settle for about 30 minutes and refiltered to remove a gummy, low-potency precipitate. The filtrate is passed over a resinous bed of Dowex 50 (H$^+$ form) of such an amount that there is one liter of resin for each 50 to 120 g. of cephalosporin activity in the input solution. The effluent from this treatment is then passed over a column of IR-68 (acetate or formate form), of such an amount that 25 to 60 g. of activity will be in contact with each liter of resin. The effluent liquid from the IR-68 column is withdrawn for recovery of the acetone by distillation, and the adsorbate is eluted with pH 3.5 to 4.0 sodium acetate or like buffer solution of about 40 to 50 times the volume of IR-68 used. The eluate is concentrated to a thick syrup at a temperature no higher than about 30° C., seeded with crystals of cephalosporin C if needed to induce crystallization, and allowed to crystallize.

The resultant slurry is a syrupy crystalline mass, which is diluted with about two volumes of methanol to improve its filterability and to produce a drier, more easily compounded product.

This diluted slurry is filtered and the solid, crystalline product is air dried.

The process of the invention, when carried out in the manner of the above description, provides improved yields of high-quality purified cephalosporin C which can be used according to any of the methods known in the art to prepare 7-aminocephalosporanic acid, commonly known as cephalosporin nucleus.

It can readily be seen that the process of this invention has considerable advantage over prior-art procedures by elminating several of the manipulative techniques and by avoiding the addition of certain other buffering solutions which must subsequently be removed.

The following example will more specifically describe, but not limit, the process of this invention.

EXAMPLE

Crude cephalosporin C fermentation broth, one volume, was filtered to remove the mycelia and other insolubles, and the filtrate was comingled with 2.33 volumes of acetone. The resulting mixture was allowed to settle for 30 minutes and was then refiltered. The filtrate was assayed for its cephalosporin C activity and passed over a resinous bed of Dowex 50 ($H^+$ form) in the ratio of one liter of resin for each 60 g. of cephalosporin C to be acidified. The effluent from this treatment was passed over a column of IR-68 (acetate form), of such an amount that 30 g. of cephalosporin C was in contact with each one liter of resin. The adsorbate was eluted with about 50 volumes (based on the volume of IR-68 used) of a pH 3.5 sodium formate buffer solution. The eluate was concentrated to a thick syrup, seeded with a crystal of cephalosporin C, and allowed to crystallize. Owing to the syrupy nature of the resulting crystalline mass, about two volumes of methanol were added and stirred into the mixture to improve filterability. The diluted crystalline slurry was filtered and the crystals of cephalosporin C were air dried.

I claim:

1. In the process for the recovery and purification of cephalosporin C, wherein the products of fermentation are separated by filtration and cephalosporin C is recovered from the resulting crude broth filtrate by adsorption on an ion-exchange material and elution therefrom, the improvement which comprises adding 1 to 4 volumes of acetone to the initial broth filtrate, whereby impurities are precipitated therefrom, and separating the precipitated impurities from the purified filtrate prior to adsorption of cephalosporin C therefrom.

2. In the process of claim 1, the further improvement which comprises adsorbing the cephalosporin C from the purified filtrate on an intermediate-strength ion-exchange resin in the acetate or formate form, and eluting the cephalosporin C therefrom with an aqueous formate or acetate buffer at about pH 2.5 to about pH 5, whereby the purified antibiotic is substantially completely freed from impurities produced in the fermentation.

3. In the process of claim 1, the steps which comprise:
(A) Adding 2 to 3 volumes of acetone to the initial broth filtrate;
(B) Filtering the resulting mixture;
(C) Contacting the resulting filtrate with a strong ion-exchange resin in the $H^+$ form;
(D) Contacting the treated filtrate with an intermediate strength ion-exchange resin in the acetate or formate form, whereby the cephalosporin C is adsorbed therefrom;
(E) Eluting the cephalosporin C from the adsorbate with an aqueous formate or acetate buffer at about pH 3.5 to about pH 4;
(F) Concentrating the eluate in vacuo at a temperature not substantially above about 30° C. and crystallizing cephalosporin C therefrom;
(G) Adding 1 to 5 volumes of methanol to the resulting slurry to aid filtration of the crystalline purified cephalosporin C; and
(H) Filtering the crystalline purified cephalosporin therefrom.

References Cited
UNITED STATES PATENTS 3,094,527  6/1963  Florey et al. _____ 260—243

NICHOLAS S. RIZZO, Primary Examiner